No. 844,593. PATENTED FEB. 19, 1907.
C. J. HARTER.
STATION INDICATOR.
APPLICATION FILED FEB. 8, 1906.

No. 844,593. PATENTED FEB. 19, 1907.
C. J. HARTER.
STATION INDICATOR.
APPLICATION FILED FEB. 8, 1906

Witnesses
Inventor
Clarence J. Harter
by H. R. Wilson
Attorney

No. 844,593. PATENTED FEB. 19, 1907.
C. J. HARTER.
STATION INDICATOR.
APPLICATION FILED FEB. 8, 1906.

Witnesses
Inventor
Clarence J. Harter
by H. B. Wilson
Attorney

No. 844,593. PATENTED FEB. 19, 1907.
C. J. HARTER.
STATION INDICATOR.
APPLICATION FILED FEB. 8, 1906.

Witnesses
C. H. Griesbauer

Inventor
Clarence J. Harter
by H. B. Willson
Attorney

No. 844,593. PATENTED FEB. 19, 1907.
C. J. HARTER.
STATION INDICATOR.
APPLICATION FILED FEB. 8, 1906.

Witnesses
C. H. Griesbauer

Inventor
Clarence J. Harter
by H. B. Wilson
Attorney

No. 844,593. PATENTED FEB. 19, 1907.
C. J. HARTER.
STATION INDICATOR.
APPLICATION FILED FEB. 8, 1906.

Witnesses
Inventor
Clarence J. Harter
by H. B. Wilson
Attorney

No. 844,593. PATENTED FEB. 19, 1907.
C. J. HARTER.
STATION INDICATOR.
APPLICATION FILED FEB. 8, 1906.

Witnesses
Inventor
Clarence J. Harter
by H. B. Wilson
Attorney

No. 844,593. PATENTED FEB. 19, 1907.
C. J. HARTER.
STATION INDICATOR.
APPLICATION FILED FEB. 8, 1906.

Witnesses
C. [illegible]
C. H. Griesbauer.

Inventor
Clarence J. Harter
by H. R. Wilson
Attorney

No. 844,593. PATENTED FEB. 19, 1907.
C. J. HARTER.
STATION INDICATOR.
APPLICATION FILED FEB. 8, 1906.

Witnesses
Inventor
Clarence J. Harter
by H. R. Wilson
Attorney

UNITED STATES PATENT OFFICE.

CLARENCE J. HARTER, OF ILION, NEW YORK, ASSIGNOR OF ONE-FOURTH TO ERNEST I. HARTER, OF HERKIMER, NEW YORK, AND ONE-FOURTH TO MONTRAVILLE E. PLATTS, OF ILION, NEW YORK.

STATION-INDICATOR.

No. 844,593.  Specification of Letters Patent.  Patented Feb. 19, 1907.

Application filed February 8, 1906. Serial No. 300,116.

*To all whom it may concern:*

Be it known that I, CLARENCE J. HARTER, a citizen of the United States, residing at Ilion, in the county of Herkimer and State of New York, have invented certain new and useful Improvements in Station-Indicators; and I do declare the following to be a full, clear, and exact description of the invention, such as will enable others skilled in the art to which it appertains to make and use the same.

This invention relates to improvements in station or street indicators for cars.

The object of the invention is to provide an indicator of this character adapted to be automatically operated at the approach to each street or station to indicate to the passengers within the car the name of the street or station which the car is approaching.

A further object is to provide a device of this character having means whereby the operating mechanism will be automatically reversed when the car reaches the end of its route.

With the above and other objects in view the invention consists of certain novel features of construction, combination, and arrangement of parts, as will be hereinafter described and claimed.

In the accompanying drawings, Fig. 3 is an enlarged front elevation of the indicator with the front plate of the casing removed. Fig. 6 is an end view of one end with the end plate of the casing removed.

Figures 1, 2:
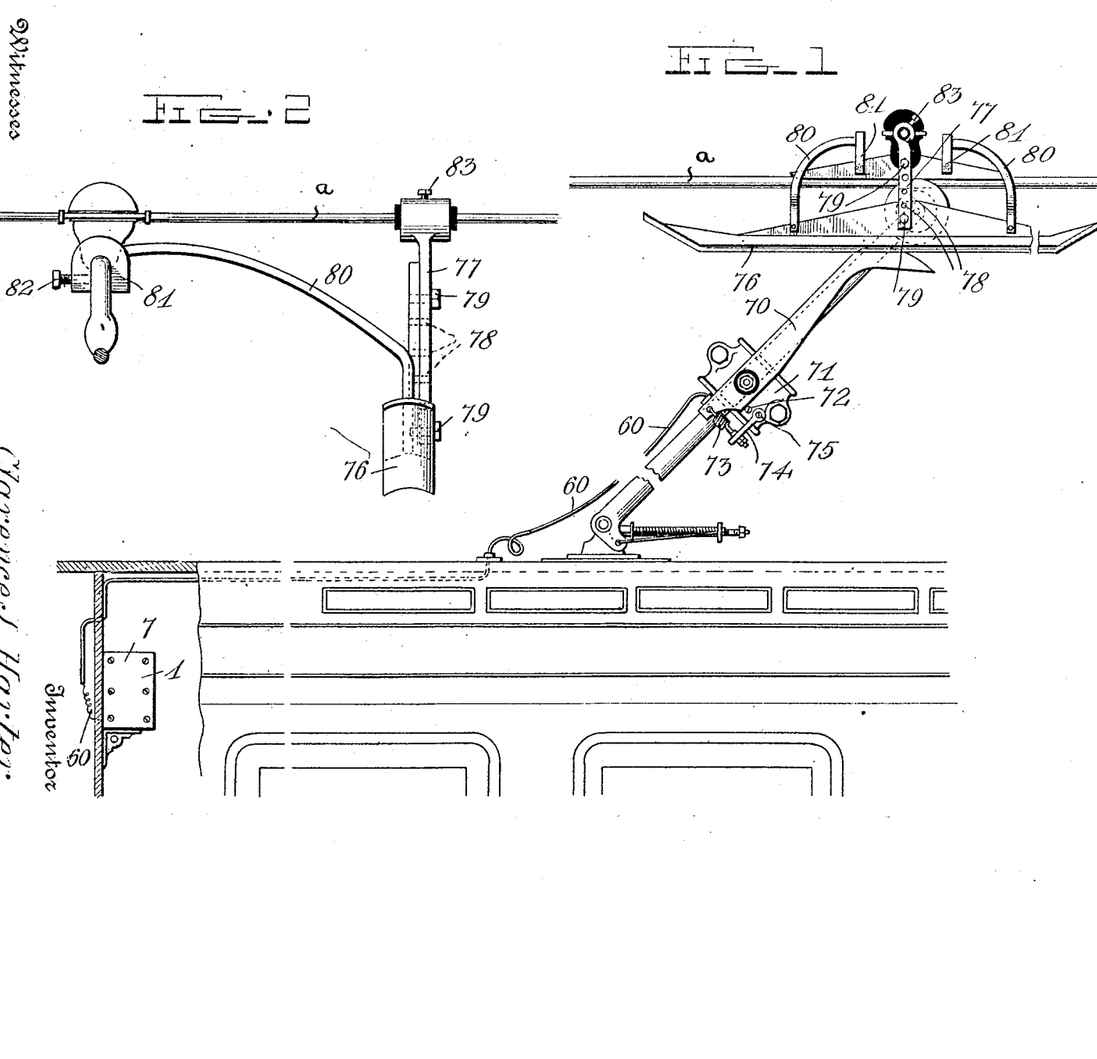
Figure 1 is a sectional view of a portion of a trolley-car, showing the arrangement of the indicator therein and the manner in which electricity is taken from the trolley-wire and conducted to the indicator to operate the same.
Fig. 2 is an end elevation of the contact-shoe, showing the arrangement of the hangers which support the same.
Figure 2:
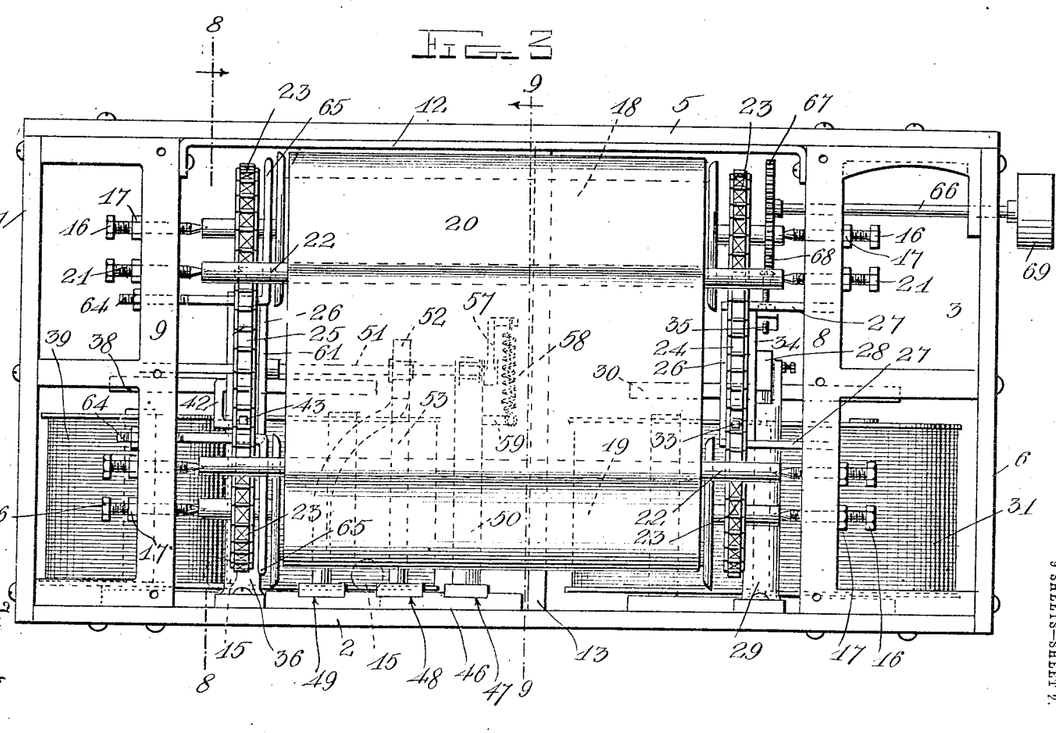
Figure 4:
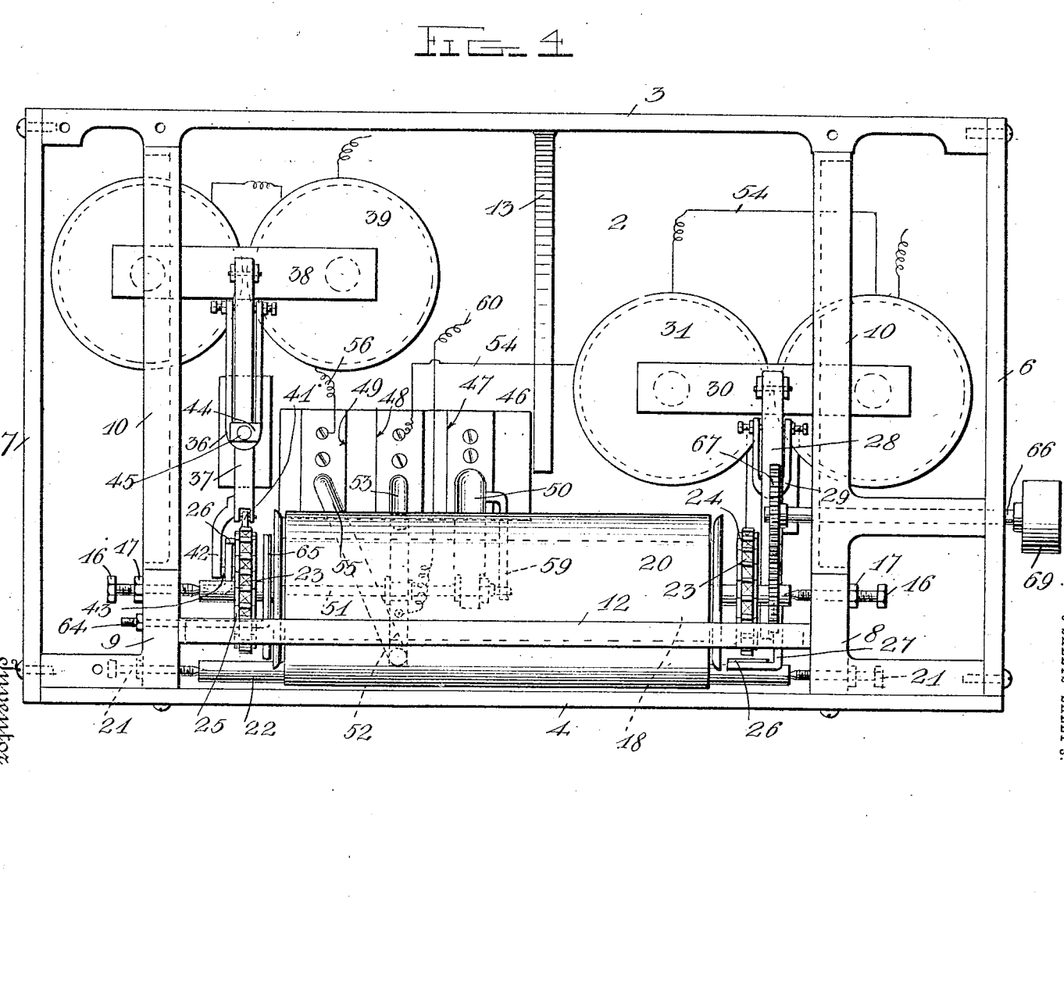
Fig. 4 is a top plan view with the top plate of the casing removed.
Figure 5:
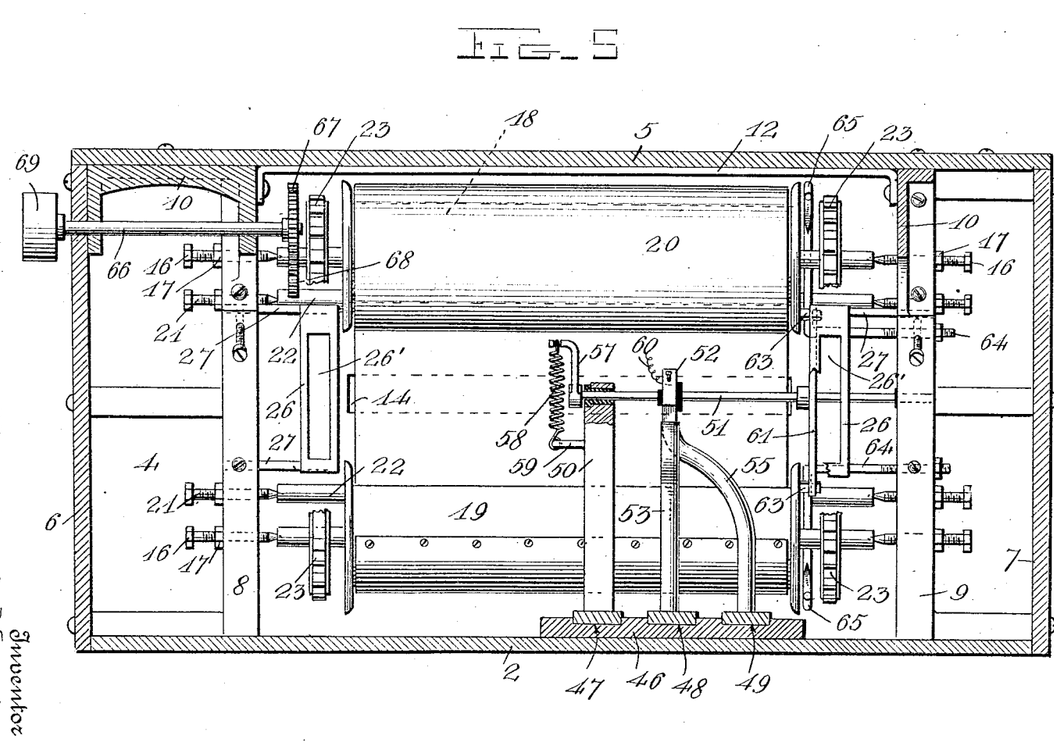
Fig. 5 is a rear elevation with the back plate of the casing and certain parts removed.
Figure 7:
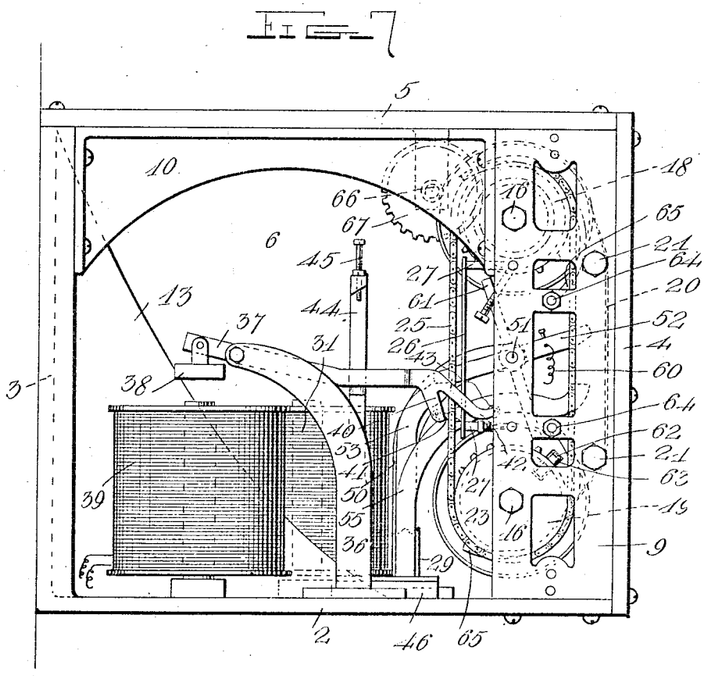
Fig. 7 is a similar view of the opposite end.
Figure 8:
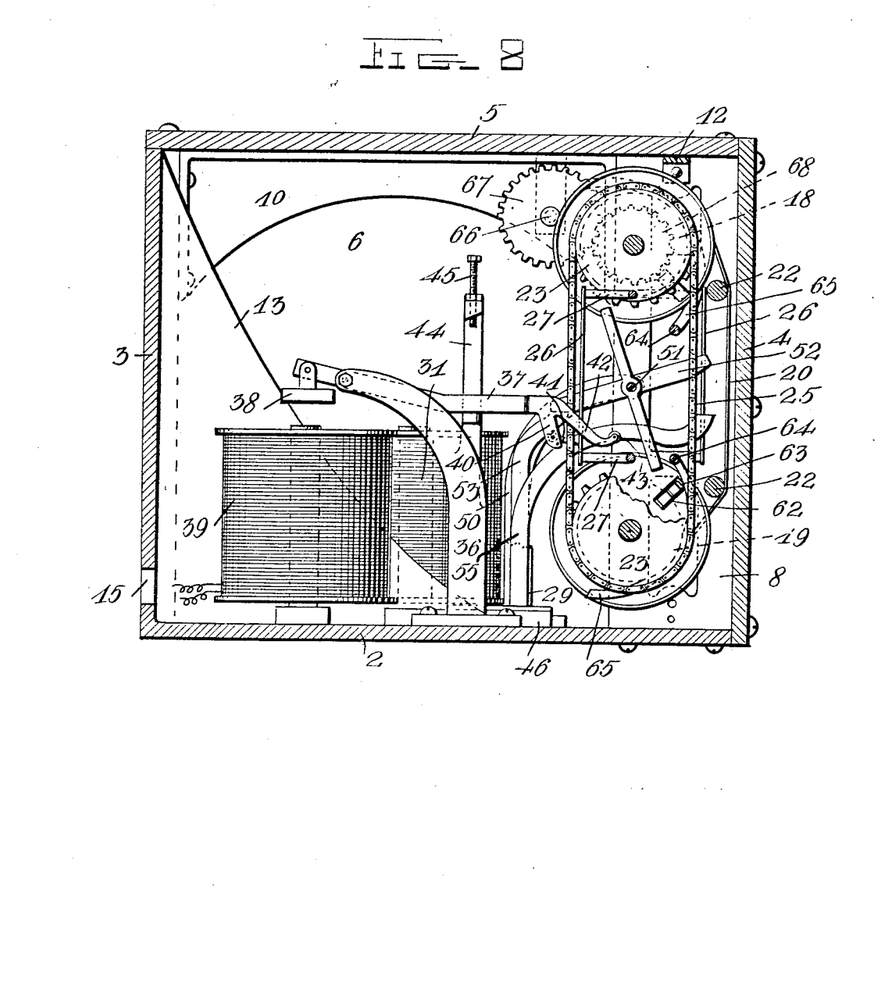
Fig. 8 is a vertical cross-sectional view on the line 8 8 of Fig. 3 looking in the direction of the arrow.
Figure 9:
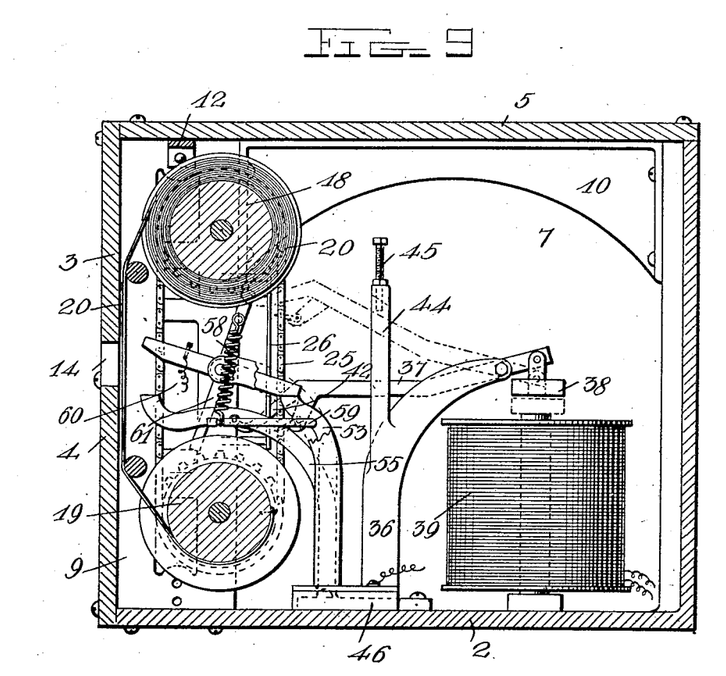
Fig. 9 is a similar view on the line 9 9 of Fig. 3 looking in the direction of the arrow.
Figures 10, 11, 12, 13, 14:
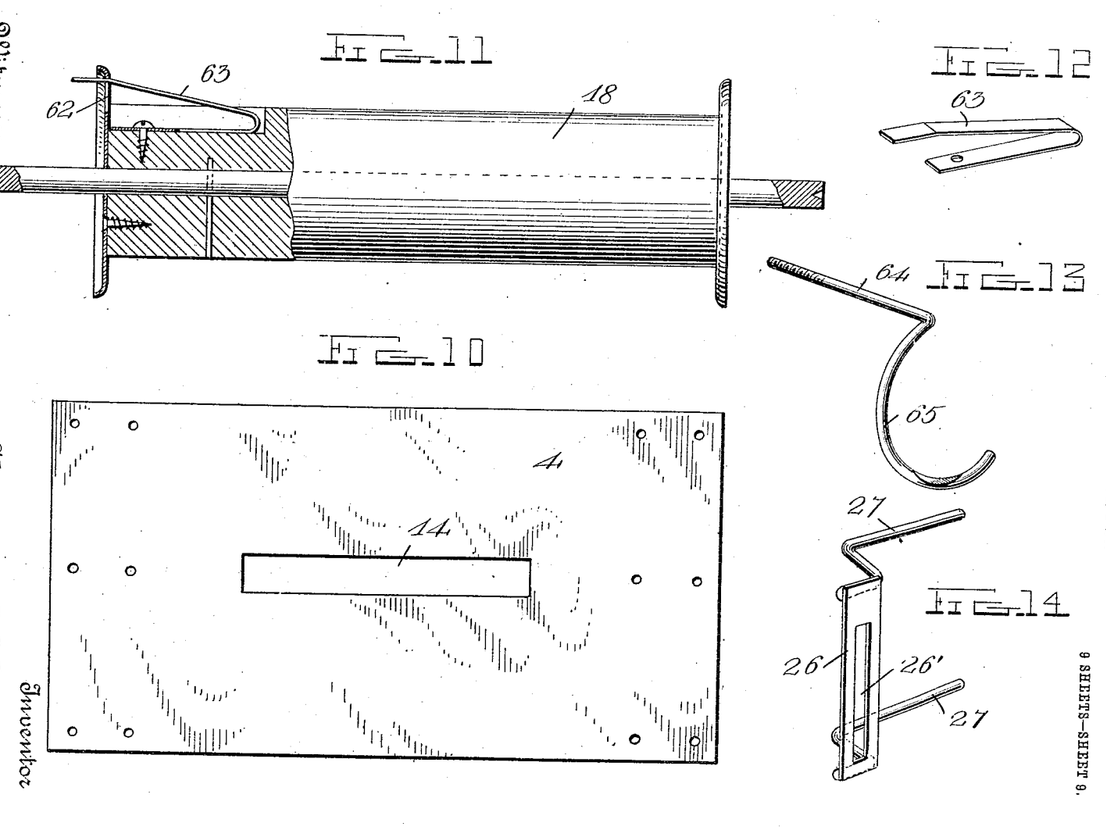
Fig. 10 is a detail elevation of the front plate of the casing.
Fig. 11 is a detail side view, partly in section, of one of the ribbon-winding rollers.
Fig. 12 is a detail perspective view of one of the reversing-springs carried by the rollers.
Fig. 13 is a similar view of one of the reversing-spring guides.
Fig. 14 is a similar view of one of the chain-guides and its supporting-brackets.

Referring more particularly to the drawings, 1 denotes the indicator, which is adapted to be arranged in any suitable portion of a car. The indicator 1 comprises a rectangular oblong box or casing, preferably consisting of integrally-formed bottom and back plates 2 and 3, a front plate 4, top plate 5, and end plates 6 and 7. Secured to the bottom plate 2, adjacent to the front edge thereof and immediately in rear of the front plate, are right and left supporting-standards 8 and 9, said standards being securely bolted or screwed to the plates forming the top, bottom, and front of the casing. The standards 8 and 9 are further braced at their upper ends by means of rearwardly-projecting truss-braces 10, connected to the back plate of the casing, as shown, and by a connecting bar or brace 12, arranged between and secured to the same near their upper ends. The bottom and back plates of the casing are strengthened by a centrally-disposed web 13. In the front plate of the casing is formed an elongated slot or view-opening 14, through which the inscriptions on the indicating-ribbon may be read. In the rear plate of the casing is formed one or more openings 15, Fig. 8, through which the conducting-wires 60, Fig. 1, may be passed to the operating mechanism within the casing.

At suitable points near the upper and lower ends of the supporting-standards 8 and 9 are arranged pivot-screws 16, said screws being adapted to be held in their adjusted positions by means of lock-nuts 17. Pivotally mounted on the upper screws 16 is an upper ribbon-winding roller 18, and on the lower screws 16 is pivotally mounted a lower ribbon-winding roller 19. On the rollers 18 and 19 is adapted to be wound an indicating-ribbon 20, on which is adapted to be inscribed the named of the streets or stations passed by the car. Arranged in the standards 8 and 9 are other pivot-screws 21, between which are pivotally mounted upper and lower guide-rollers 22, over which the indicating-ribbon is adapted to pass and by means of which said ribbon is held into close engagement with the inner side of the front plate of the casing.

Fixedly mounted on each end of the upper and lower ribbon-rollers are sprocket-gears 23. Around the gears 23 on the right-hand end of the rollers is arranged a sprocket-chain 24, and around the gears on the left-hand end of the rollers is arranged a chain 25. The working stretches of the chains 24 and 25 are provided with vertically-disposed guide-plates 26, held in position by means of brackets 27, connected to the supporting-standards 8 and 9, as shown, said guide-plates being provided with longitudinally-disposed slots 26'.

Adapted to be engaged with the right-hand chain 24 is an operating-lever 28, said lever being pivotally mounted in a supporting-standard 29, secured to the base-plate of the casing in the rear and to one side of the right-hand gears 23, as shown. Connected to the rear end of the operating-lever 28 is an armature 30, adapted to be attracted by an electromagnet 31, arranged in the rear portion of the casing and secured to the bottom plate thereof. Arranged on the opposite end of the lever 28 is a downwardly-projecting arm 32, in which is pivotally mounted a pawl or dog 33, said pawl or dog being adapted to be brought into engagement with the adjacent stretch of the chain 24 when the lever 28 is actuated by the magnet 31, thereby lifting said stretch of the chain and turning the ribbon-winding rollers 18 and 19 in one direction. The lever 28 has formed in its upper side adjacent to the working end thereof a series of notches $33^x$, adapted to engage the teeth of the upper right-hand gear-wheel 23 when the lever is raised to its extreme limit, thereby locking said gear and the rollers against further movement. On the supporting-standard 29 is arranged an upwardly-projecting arm 34, having a right-angular projection on its upper end, in which is arranged a stop-screw 35, against which the lever 28 is adapted to strike and by means of which the upward movement of said lever is limited.

In the opposite side or end of the casing and immediately in rear of the left-hand gears 23 and chain 25 is a supporting-standard 36, in the upper end of which is pivoted a left-hand operating-lever 37, said lever having on its rear end an armature 38, adapted to be attracted by an electromagnet 39. On the opposite or forward end of the lever 37 is arranged a downwardly-projecting arm 40, in which is pivotally mounted a pawl or dog 41, said pawl being adapted to be engaged with the adjacent stretch of the left-hand chain 25, whereby when the lever 37 is actuated by the magnet 39 said stretch of the chain will be lifted, thereby turning the gears 23 and the ribbon-winding rollers in a reverse direction, or opposite to that by which the same are turned by the lever 28. The ends of the pawls 33 and 41 when engaging their respective stretches of the chains 24 and 25 will project through the slots 26' in the guide-plates 26. On the working end of the lever 37 is arranged an obliquely-disposed stop-arm 42, in the outer end of which is journaled a stop-roller 43, which when the lever 37 has been rocked upwardly to its extreme position will engage the teeth of the upper left-hand gear 23, thereby locking said gear and the ribbon-winding rollers against further movement. On the standard 36 is arranged an upwardly-projecting arm 44, having a right-angular projection on its upper end, in which is arranged a stop-screw 45, against which the lever 37 is adapted to strike and by means of which the upward movement of said lever may be limited.

Secured to the bottom plate of the casing immediately in rear and adjacent to one end of the ribbon-winding rollers is a base-plate 46, in which are formed transversely-disposed seats or notches 47, 48, and 49. In the notch 47 of the plate 46 is arranged an upwardly-projecting forwardly-curved bearing-standard 50, the upper rear end of which projects between the upper and lower rollers 18 and 19, as shown. Journaled in the upper end of the bearing-standard 50 and the adjacent left-hand supporting-standard 9 is a horizontally-disposed shaft 51, on which is fixedly mounted a contact-bar 52, said bar being insulated from the shaft.

Arranged in the notch or recess 40 of the base-plate 46 is an upwardly-projecting contact-post 53, connected by conducting-wires 54 to the magnet 31. In the notch or recess 49 of the base-plate 46 is secured an upwardly-projecting forwardly-curved contact-post 55, connected by conducting-wire 56 with the magnet 39. Fixedly mounted on the inner end of the shaft 51 is a crank-arm 57, to which is connected the upper end of a coiled spring 58, the lower end of which is connected to an arm 59, arranged on the bearing-standard 50. The contact-bar 52 is adapted to be rocked by the shaft 51 into engagement with one or the other of the contact-posts 53 or 55 and to be held in contact with one or the other of said posts by means of the crank-arm 57 and spring 58. To the contact-bar 52 is connected the main supply wire or conductor 60, by which electricity is conducted from the trolley-wire $a$ or other source of supply, the electrical current passing from said wires through the bar 52 to one or the other of the contact-posts 53 or 55 and from said post to one or the other of the magnets 31 or 39, thus energizing said magnets and causing the same to actuate the operating mechanism on one side or the other of the indicator.

In order that the operating mechanism may be automatically reversed when the car reaches the end of its route, a suitable reversing mechanism is provided, by means of which the contact-bar 52 may be brought into engagement with the proper contact-post to energize the magnet connected therewith. The reversing mechanism is herein shown and preferably consists of a reversing-lever 61, which is fixedly mounted on the shaft 51 in such a position that the opposite ends of the lever will lie adjacent to the ends of the upper and lower ribbon-winding rollers 18 and 19, as shown. In the end of each of the rollers 18 and 19 adjacent to the lever 51 is formed a longitudinally-disposed recess 62, in which is secured a V-shaped reversing-spring 63, one member of which is adapted to project a suitable distance beyond the end of the rollers and to spring out of the recess 62 when the ribbon 20 is wound off from the roller. When the outer member of the spring 63 is thus released by the ribbon and springs outwardly, the projecting end of the same will be in position to engage the adjacent end of the reversing-lever 61 and will rock said lever and the shaft 51 in one direction or the other, thereby changing the position of the contact-bar 52, and thus disengaging the same from one of the contact-posts 53 or 55 and connecting the same with the opposite contact-post, thereby changing the current or supply of electricity from one magnet to the other, as will be understood. Connected to the standards 8 and 9 are brackets 64, having on their inner ends right-angularly disposed curved guide-arms 65, which are arranged adjacent to the ends of the rollers 18 and 19 and lie within the path of movement of the projecting end of the reversing-spring 63 for a portion of its revolution, whereby when said end of the spring has been released by the unwinding of the ribbon and has engaged and actuated the reversing-lever 61 and the operating mechanism has been started in the opposite direction said end of the spring will engage said curved portion of the guide arm or bracket and will be again forced inwardly and held until enough of the ribbon 20 has been wound upon the roller to hold said spring in its depressed position and in a position to clear the adjacent end of the reversing-lever until the ribbon is again wound off of the roller by a reverse movement of the same.

Should it be desired to stop the car and return the same before it has reached the end of the route, or should it be necessary for any other reason to reset the operating mechanism and the ribbon 20, a suitable hand-operated resetting mechanism is provided. Said mechanism is here shown and preferably consists of a reversing-shaft 66, which is journaled in suitable bearings on the upper end of the right-hand supporting-standard 8, said shaft 66 being provided on its inner end with a spur gear-wheel 67, which is adapted to engage a similar wheel 68, fixed on the adjacent end of the upper ribbon-roller 18. The opposite end of the reversing-shaft 66 projects through a suitable opening in the adjacent end of the casing and is provided with an operating wheel or knob 69, by means of which said shaft may be turned to actuate the roller 18 and wind the ribbon 20 upon the same.

The indicator is shown in the present instance as arranged in a trolley-car having an overhead connection with a trolley-wire by means of a trolley pole and wheel of the usual or any desired construction. When the indicator is arranged in a car of this character, electricity may be supplied to the operating mechanism of the indicator through the main conducting-wire 60, which enters the casing and is connected to the contact-bar 52, as hereinbefore described. The opposite end of the supply-wire 60 is connected to a suitable contact-lever 70, which is pivotally mounted on a clamp 71, by which the same is attached to the trolley-pole of the car. The clamp 71 is insulated from said trolley-pole and is provided with a stop-pin 72, by means of which the movement of the contact-lever is limited. The lower end of the contact-lever 70 projects below the pivotal connection of the same with the clamp 71, and said projecting end has connected thereto a coil-spring 73, the opposite end of which is adjustably connected to a bracket-arm 74, secured to the clamp 71 by means of a threaded bolt 75, which is arranged in said bracket as shown.

Arranged on the trolley-wire at the approach of each street or station is a contact-shoe 76, said shoe being supported upon the guy-wires of the trolley-wire by means of an adjustable supporting-bar or hanger 77. This hanger or supporting-bar consists of two plates or bars having formed therein a series of apertures 78, which are adapted to be brought into alinement and through which are inserted clamping-bolts 79, by means of which said plates or bars of the hanger may be adjustably connected together, thus lengthening or shortening the same to permit the engagement thereof with any guy-wire. The shoe 76 is connected to the trolley-wire hanger by means of upwardly-projecting curved hanger rods or bars 80, the upper ends of which are provided with yoke-shaped clamps 81, adapted to be engaged with the trolley-wire bracket or hanger, as shown. The clamps 81 are provided with screws 82, by means of which the same are held in engagement with said trolley-hanger. The hangers 80 serve as conductors by which the electricity from the trolley-wire is carried to the shoe 76. The hanger 77 of said shoe is insulated from its supporting guy-wire. The hanger 77 is securely connected to the guy-wire by means of a clamping-screw 83.

By providing the shoe 76, supported and arranged as herein shown and described, electricity is taken from the trolley-wire by the contact-lever 70 as the car approaches a street or station, thereby actuating the operating mechanism within the indicator and causing the name of the street or station to which the car is approaching to be displayed through the view-opening 14 in the front plate 4 of the indicator-casing, as hereinbefore described.

While I have shown the device as applied to a trolley-car having an overhead electrical connection, it is obvious that the same may be applied to any form of electric-railway car and suitable connection provided with the electrical supply to actuate the operating mechanism of the indicator.

By the use of a device such as herein shown and described the name of a street or station to which the car is approaching will be automatically displayed to the passengers within the car, thus relieving the company of responsibility from neglect of the conductors or operators of the car to call out the streets or stations as the car approaches the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, means to actuate said operating devices, manually-operated means for rotating said rollers in either direction and means whereby the actuating mechanism for said operating devices at each end of the rollers is alternately energized, substantially as described.

2. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, an electromagnet connected with the operating devices at each end of the rollers, and means whereby said magnets are alternately energized, substantially as described.

3. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, an electromagnet connected with the operating devices at each end of the rollers, contact-posts connected with each of said magnets, a conducting contact-bar adapted to be engaged with one or the other of said contact-posts, and means whereby said contact-bar is automatically reversed as the ribbon is wound off from either of said rollers, substantially as described.

4. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, an electromagnet connected with the operating devices at each end of the rollers, contact-posts connected with each of said magnets, a conducting contact-bar adapted to be engaged with one or the other of said contact-posts, a reversing-lever to reverse the position and engagement of said contact-bar, and reversing-springs arranged on each of said rollers to engage the opposite ends of said reversing-lever, thereby rocking the same in one direction or the other, substantially as described.

5. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, an electromagnet connected with the operating devices at each end of said rollers, contact-posts connected with each of said magnets, a reversing-shaft, a conducting contact-bar fixed on and insulated from said shaft, means to hold said bar in engagement with one or the other of said posts, a reversing-lever fixed on said shaft, expansible reversing-springs arranged on each of said rollers to alternately engage the opposite ends of said lever when the ribbon is wound off from one or the other of said rolls, and means to automatically compress said springs into place until held by the ribbon being wound on the roller, substantially as described.

6. In an indicating device of the character described, the combination with a supporting-frame and casing, of ribbon-winding rollers journaled therein, an indicating-ribbon adapted to be wound on one of said rollers and simultaneously wound off the other, sprocket-gears fixed on the journals of said rollers, chains connecting said gears on each end of said rollers, pivotally-mounted operating-levers, pawls arranged in one end of said levers, and means to actuate one or the other of said levers, thereby causing the pawl carried thereby to engage and operate the chain at one end or the other of said rollers, said pawls being adapted to engage the opposite stretches of chain on the opposite ends of the rollers, substantially as described.

7. In an indicating device of the character described, the combination with a supporting-frame and casing, of ribbon-winding rollers journaled therein, an indicating-ribbon adapted to be wound on one of said rollers and simultaneously wound off the other, sprocket-gears fixed on the journals of said rollers, chains connecting said gears on each end of said rollers, pivotally-mounted operating-levers, pawls arranged in one end of said levers, armatures carried by the opposite ends of said levers, electromagnets to attract said armatures and thereby actuate said levers causing the pawls carried thereby to engage said chains to move the same and said rollers in one direction or the other, and means whereby said magnets are automatically energized, substantially as described.

8. In an indicating device of the character described, the combination with a supporting-frame and casing, of ribbon-winding rollers journaled therein, an indicating-ribbon adapted to be wound on one of said rollers and simultaneously wound off the other, sprocket-gears fixed on the journals of said rollers, chains connecting said gears on each end of said rollers, pivotally-mounted operating-levers, pawls arranged in one end of said levers, armatures carried by the opposite ends of said levers, electromagnets to attract said armatures and thereby actuate said levers causing the pawls in the opposite ends thereof to engage the opposite stretches of the chains on the opposite ends of said rollers and thereby turn said rollers in one direction or the other, contact-posts connected with said magnets, a conducting contact-bar, a reversing-lever to engage said bar with one or the other of said posts, and reversing-springs carried by said rollers to engage one end or the other of said lever, said springs being released and permitted to expand to an operative position by the unwinding of the ribbon from said rollers, substantially as described.

9. In an indicating device of the character described, the combination with a supporting-frame and casing, of ribbon-winding rollers journaled therein, an indicating-ribbon adapted to be wound on and off said rollers, sprocket-gears fixed on the journals of said rollers, a sprocket-chain to connect said gears at each end of the rollers, guide-plates arranged behind the working stretches of said chains, pivoted operating-levers, pawls mounted in one end of said levers to engage said chains, means to actuate said operating-levers, adjustable stops to limit the movement thereof, cog-wheels stop devices arranged on said levers to engage the teeth of said cog-wheels, means to automatically control the movement of said operating-levers, and means to manually reset said rollers and indicating-ribbon, substantially as described.

10. In an indicating device of the character described, the combination with a supporting-frame and casing, of ribbon-winding rollers journaled therein, an indicating-ribbon adapted to be wound on and off said rollers, sprocket-gears fixed on the journals of said rollers, a sprocket-chain to connect said gears at each end of the rollers, guide-plates arranged behind the working stretches of said chains, pivoted operating-levers, pawls mounted in one end of said levers to engage said chains, means to actuate said operating-levers, adjustable stops to limit the movement thereof, cog-wheels, stop devices arranged on said levers to engage the teeth of said cog-wheels, means to automatically control the movement of said operating-levers, a spur-gear fixedly mounted on the journal of one of said rollers, a resetting-shaft, a gear fixed on one end of said resetting-shaft to engage the gear on said roller, and a hand knob or wheel arranged on the opposite outer end of said shaft, substantially as described.

11. In an indicating device of the character described, the combination with a supporting-frame and casing having formed in one side a view-opening, of rollers journaled in said frame and casing, an indicating-ribbon adapted to be wound on and off said rollers, independent operating devices connected with each end of said rollers to turn the same in one direction or the other, an electromagnet connected with the operating devices at each end of the rollers, contact-posts connected with said magnets, a conducting contact-bar adapted to be automatically engaged with one or the other of said posts, conducting-wires connected with said contact-bar, and means whereby electricity is taken from the supply-conductor of the car by said conducting-wires, substantially as described.

In testimony whereof I have hereunto set my hand in presence of two subscribing witnesses.

CLARENCE J. HARTER.

Witnesses:
  M. E. PEATTS.
  ERNEST L. HARTER.